US 10,200,356 B2

(12) United States Patent
Okamura

(10) Patent No.: US 10,200,356 B2
(45) Date of Patent: Feb. 5, 2019

(54) INFORMATION PROCESSING SYSTEM, INFORMATION PROCESSING APPARATUS, INFORMATION PROCESSING METHOD, AND RECORDING MEDIUM

(71) Applicant: NEC CORPORATION, Tokyo (JP)

(72) Inventor: Toshihiko Okamura, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 98 days.

(21) Appl. No.: 15/523,071

(22) PCT Filed: Oct. 20, 2015

(86) PCT No.: PCT/JP2015/005287
§ 371 (c)(1),
(2) Date: Apr. 28, 2017

(87) PCT Pub. No.: WO2016/067565
PCT Pub. Date: May 6, 2016

(65) Prior Publication Data
US 2017/0318002 A1    Nov. 2, 2017

(30) Foreign Application Priority Data
Oct. 29, 2014    (JP) .................................. 2014-219839

(51) Int. Cl.
*H04L 29/06* (2006.01)
*H04L 9/32* (2006.01)

(52) U.S. Cl.
CPC ............. *H04L 63/08* (2013.01); *H04L 9/32* (2013.01); *H04L 9/3239* (2013.01); *H04L 63/123* (2013.01); *H04L 2209/38* (2013.01)

(58) Field of Classification Search
None
See application file for complete search history.

(56) References Cited

U.S. PATENT DOCUMENTS

| 6,148,404 A * | 11/2000 | Yatsukawa ............ G06F 21/335 |
| | | 380/30 |
| 2005/0138379 A1* | 6/2005 | Semple ................. H04L 9/3242 |
| | | 713/170 |

(Continued)

FOREIGN PATENT DOCUMENTS

| JP | 2001-249901 A | 9/2001 |
| JP | 2003-066836 A | 3/2003 |

(Continued)

OTHER PUBLICATIONS

Morris Dworkin, "Recommendation for Block Cipher Modes of Operation: The CMAC mode for Authentication", [online], May 2005, NIST Special Publication 800-38B, National Institute of Standards and Technology, retrieved on Oct. 10, 2014, the Internet <http://csrc.nist.gov/publications/nistpubs/800-38B/SP_800-38B.pdf>.

(Continued)

*Primary Examiner* — Shin-Hon (Eric) Chen
(74) *Attorney, Agent, or Firm* — Sughrue Mion, PLLC

(57) ABSTRACT

An information processing system performing highly secure broadcast authentication while reducing a delay until authentication, a communication amount, and a computation amount is provided. A server (100) generates authentication information for transmission data by combining a tag relating to the transmission data and a chain value associated in a chain with transmission order of the transmission data. The tag relating to the transmission data is generated by using a common key. The chain is generated by using a one-way function. A node (200) verifies whether a chain value associated with transmission order of data received in the past is generated or not by applying the one-way function to a chain value extracted by using a tag relating to the received data and authentication information for the received data.

(Continued)

The tag relating to the received data is generated by using the common key.

6 Claims, 8 Drawing Sheets

(56) References Cited

U.S. PATENT DOCUMENTS

| | | | | |
|---|---|---|---|---|
| 2010/0070769 A1* | 3/2010 | Shima | ............... | G06F 11/3476 713/171 |
| 2011/0296192 A1* | 12/2011 | Hayashi | ............ | G06F 12/1441 713/180 |
| 2014/0029701 A1* | 1/2014 | Newham | ............... | H04L 7/041 375/340 |
| 2014/0040633 A1* | 2/2014 | Leleu | ................... | G06F 21/36 713/189 |
| 2014/0074719 A1* | 3/2014 | Gressel | ............ | G06Q 20/3827 705/64 |

FOREIGN PATENT DOCUMENTS

| | | |
|---|---|---|
| JP | 2003-318884 A | 11/2003 |
| JP | 2010-252275 A | 11/2010 |

OTHER PUBLICATIONS

"The Keyed-Hash Message Authentication Code (HMAC)", [online], Jul. 2008, FIPS Pub 198-1 (Federal Information Processing Standards Publication), Information Technology Laboratory National Institute of Standards and Technology, [retrieved on Oct. 10, 2014], the Internet <http://csrc.nist.gov/publications/fips/fips198-1/FIPS-198-1_final.pdf>.

Adrian Perring et al., "Efficient Authentication and Signing for Multicast Streams over Lossy Channels", Proceeding of the 2000 IEEE Symposium on Security and Privacy, May 2005, pp. 56-73.

International Search Report of PCT/JP2015/005287 dated Jan. 19, 2016 [PCT/ISA/210].

Written Opinion of PCT/JP2015/005287 dated Jan. 19, 2016 [PCT/ISA/237].

* cited by examiner

INFORMATION PROCESSING SYSTEM, INFORMATION PROCESSING APPARATUS, INFORMATION PROCESSING METHOD, AND RECORDING MEDIUM

CROSS REFERENCE TO RELATED APPLICATIONS

This application is a National Stage of International Application No. PCT/JP2015/005287, filed Oct. 20, 2015, claiming priority based on Japanese Patent Application No. 2014-219839, filed Oct. 29, 2014, the contents of all of which are incorporated herein by reference in their entirety.

TECHNICAL FIELD

The present invention relates to an information processing system, an information processing apparatus, an information processing method, and a recording medium, and particularly, relates to an information processing system, an information processing apparatus, an information processing method, and a recording medium for performing message authentication.

BACKGROUND ART

Broadcast communication is simultaneous communication from a server (transmitting device) to a plurality of nodes (receiving devices) on a network. In a case of transmitting an identical content from a server to a plurality of nodes, use of the broadcast communication significantly improves communication efficiency in comparison with a case of repeating one-to-one communication between the server and each of the nodes. Thus, the broadcast communication is advantageous particularly in radio communication, not only for television broadcasting and radio broadcasting, but also for the Internet and a sensor network. In recent years, due to increasing cyber-attacks, the broadcast communication has been also demanded to take measures for information security, and it has become important to perform data authentication that verifies whether data received by each node is data transmitted from a server.

In general, a node may be often provided at a place directly accessible by an attacker. In addition, security measures on a node may be often insufficient because of performance degradation and cost increase involved in the security measures. Thus, a node has a higher possibility of leakage of confidential information than a server. The broadcast communication needs a data authentication scheme in consideration of such a situation.

Data authentication using cryptography is roughly classified into two types, which are digital signature using public-key cryptography and message authentication using common-key cryptography.

In the digital signature, a server holds a secret key for signature generation, and a node holds a public key for signature verification. Since it is difficult to estimate the secret key from the public key because of a nature of the public-key cryptography, an attacker attacking the node is unable to obtain the secret key necessary for signature generation. Therefore, it is difficult to falsify broadcast data. However, the digital signature using the public-key cryptography has a problem that a computation amount and a communication amount (signature length) are extremely large in comparison with the message authentication using the common-key cryptography. Thus, in a network constituted of small-sized nodes such as sensors, it is preferable to use the low-complexity message authentication.

FIG. 10 is a diagram illustrating how general message authentication works.

In the message authentication, a server and a node share a secret key in advance. The server generates a tag T from transmission data D and a counter value n through cipher processing, and transmits the tag T with the data D. The counter value n is used to prevent a replay attack and is incremented for each object to be authenticated such as a packet. The node holds a received counter value, and when the received counter value n' is appropriately updated from a currently held counter value, the node determines that received data is not data transmitted in the replay attack. When this determination is passed, the node generates a tag from the received data D' and the counter value n' through cipher processing, similarly to the server. When the generated tag matches with a received tag T', the node determines that the received data D' is valid data (D'=D) from the server.

As message authentication processing using block cipher, a CMAC (Cipher-based MAC algorithm) based on a CBC-MAC (Cipher Block Chaining MAC algorithm) as disclosed in NPL 1 is often used. In addition, as message authentication processing using a cryptographic hash function, a HMAC (Keyed-Hash Message Authentication Code) as disclosed in NPL 2 is often used.

Message authentication in broadcast communication (hereinafter called broadcast authentication) can be realized by, for example, a server and all nodes sharing a secret key. At this time, leakage of the secret key from one node may cause broadcast data to be falsified very easily and affects all the nodes.

As one method of enhancing security of the broadcast authentication using the common-key cryptography, message authentication using a plurality of secret keys is known. A server holds a set L of secret keys, and a node u holds a subset L(u) of the set L. The server generates tags for data to be broadcast by using all secret keys of the set L and transmits the tags with the data. The node u generates tags from received data by using all secret keys of the subset L(u). When all the generated tags respectively match corresponding tags included in received tags, the node u determines that the received data is data transmitted from the server.

In addition, as another method of enhancing security of the broadcast authentication using the common-key cryptography, Timed Efficient loSs-toLerant Authentication (TESLA) is disclosed in NPL 3.

In the TESLA, a server generates a secret key for message authentication by using a one-way chain. The server calculates secret keys $K[n-1], \ldots, K[0]$ by using a random secret key $K[n]$ and a one-way function f in accordance with Math. 1.

$$K[i]=f(K[i+1]), i=N-1, N-2, \ldots, 1, 0 \quad \text{[Math. 1]}$$

Herein, N is a length of a chain. The length of a chain is a parameter that determines the number of message authentications executable for one setting of a secret key $K[0]$ from a server to a node. In an initial setting, the server generates and holds a chain of the secret keys and sets a secret key $K[0]$ to a node. For the setting of the secret key $K[0]$, one-to-one communication between the server and each node or normal digital signature is used. When the digital signature is used, a secret key $K[0]$ received by the node is verified as being the secret key $K[0]$ transmitted from the server.

In the TESLA, when broadcasting pieces of data D[1], ..., D[n], a server generates tags for message authentications by using secret keys K[1], ..., K[n], respectively, and transmits the tags. When data D[i] indicates entire pieces of transmission data within a time slot, the server generates a tag for each piece of the transmission data in the data D[i] by using a secret key K[i].

The server transmits the secret key K[i] after a lapse of a certain time from transmitting the data D[i]. A node holds a secret key K[i'] (i'<i). After receiving a secret key K[i], the node confirms that the secret key K[i] is the valid secret key K[i] transmitted from the server by verifying that a value of the secret key K[i] obtained by (i−i')-time application of the one-way function f matches the held secret key K[i']. The node authenticates the data D[i] after the verification of the secret key K[i]. In addition, the node is prepared for receiving a secret key K[i+1] by holding the secret key K[i].

In the TESLA, by delaying disclosure of a secret key with respect to transmitting of data and a tag for message authentication, a node is able to confirm that received data is data from a server knowing a valid secret key. In addition, the node does not hold a secret key K[i] at a point of time when the server transmits data D[i]. Thus, an attacker attacking the node is unable to acquire the secret key K[i] at the point of time, and it is difficult to generate a tag T[i] for data other than the data D[i]. In addition, in comparison with general one-to-one-communication message authentication, increase in a communication amount and a computation amount is relatively small. Thus, the TESLA is more efficient than the general one-to-one-communication message authentication.

Note that, as a related art, PTL 1 discloses a technique of using a one-way function in a digital signature scheme that uses public-key cryptography. In addition, PTL 2 discloses a technique of performing authentication of inter-device communication by using authentication information generated with a one-way function.

CITATION LIST

Patent Literature

[PTL 1] Japanese Patent Application Laid-Open Publication No. 2003-318884
[PTL 2] Japanese Patent Application Laid-Open Publication No. 2010-252275

Non Patent Literature

[NPL 1] Morris Dworkin, "Recommendation for Block Cipher Modes of Operation: The CMAC mode for Authentication", [online], May, 2005, NIST Special Publication 800-38B, National Institute of Standards and Technology, retrieved on Oct. 10, 2014, the Internet <http://csrc.nist.gov/publications/nistpubs/800-38B/SP_800-38B.pdf>
[NPL 2] "The Keyed-Hash Message Authentication Code (HMAC)", [online], July, 2008, FIPS PUB 198-1 (FEDERAL INFORMATION PROCESSING STANDARDS PUBLICATION), Information Technology Laboratory National Institute of Standards and Technology, [retrieved on Oct. 10, 2014], the Internet <http://csrc.nist.gov/publications/fips/fips198-1/FIPS-198-1_final.pdf>
[NPL 3] Adrian Perring, Ran Canetti, J. D. Tygar, and Dawn Song, "Efficient Authentication and Signing for Multicast Streams over lossy Channels", Proceeding of the 2000 IEEE Symposium on Security and Privacy, May, 2005, p. 56-73

SUMMARY OF INVENTION

Technical Problem

In the message authentication using a plurality of secret keys among the above-described methods of enhancing security of the broadcast authentication, a server needs to transmit tags proportional to a size of the set L of secret keys. Since the set L of secret keys is required to be large for enhancing security of a large-scale network, a length of tags to be transmitted becomes long. This diminishes an effect of reduced communication overhead in authentication information, which is an advantage of the message authentication.

On the other hand, in the message authentication using the TESLA, when a secret key K[i] is disclosed from a server before a node receives data D[i] and a tag T[i], an attacker can cause the node to receive false data. In other words, the attacker, since having acquired the secret key K[i], can cause the node to receive false data by generating a tag for arbitrary data with the secret key K[i] and transmitting the tag, and thereafter disclosing the secret key K[i]. Therefore, the server needs to transmit the secret key K[i] with a sufficient time allowance so that all nodes can receive the secret key K[i] after receiving the data D[i] and the tag T[i]. This causes a large delay from data reception to authentication performed by a node.

An object of the present invention is to provide an information processing system, an information processing apparatus, an information processing method, and a recording medium capable of solving the above-described problem and performing highly secure broadcast authentication while reducing a delay until authentication, a communication amount, and a computation amount.

Solution to Problem

An information processing system according to an exemplary aspect of the present invention includes: a first information processing apparatus including first tag generating means for generating a tag relating to transmission data by using a common key, chain generating means for generating a chain that is a sequence of values generated in order by repeatedly applying a one-way function to a value and in which generation order of each value is inversely associated with transmission order of data, combining means for generating authentication information for the transmission data by combining a value associated in the chain with transmission order of the transmission data with a tag relating to the transmission data, and transmitting means for transmitting the transmission data and the authentication information for the transmission data to a second information processing apparatus; and the second information processing apparatus including receiving means for receiving data and authentication information for the data from the first information processing apparatus, second tag generating means for generating a tag relating to the received data by using the common key, separating means for extracting a value in the chain from the authentication information for the received data by using the tag relating to the received data, and verifying means for authenticating the received data by applying the one-way function to a value in the chain extracted from the authentication information for the received data and verifying whether a value associated in the chain with transmission order of data received in the past is generated or not.

A first information processing apparatus according to an exemplary aspect of the present invention includes: tag generating means for generating a tag relating to transmission data by using a common key; chain generating means for generating a chain that is a sequence of values generated in order by repeatedly applying a one-way function to a value and in which generation order of each value is inversely associated with transmission order of data; combining means for generating authentication information for the transmission data by combining a value associated in the chain with transmission order of the transmission data with a tag relating to the transmission data; and transmitting means for transmitting the transmission data and authentication information for the transmission data to another information processing apparatus that applies the one-way function to a value in the chain extracted by using a tag relating to received data and authentication information for the received data, the tag relating to the received data being generated by using the common key, and verifies whether a value associated in the chain with transmission order of data received in the past is generated or not.

A second information processing apparatus according to an exemplary aspect of the present invention includes: receiving means for receiving data and authentication information for the data from another information processing apparatus that generates authentication information for transmission data by combining a tag relating to the transmission data with a value associated in a chain with transmission order of the transmission data, the tag relating to the transmission data being generated by using a common key, the chain being a sequence of values generated in order by repeatedly applying a one-way function to a value and in which generation order of each value is inversely associated with transmission order of data; tag generating means for generating a tag relating to the received data by using the common key; separating means for extracting a value in the chain from the authentication information for the received data by using the tag relating to the received data; and verifying means for authenticating the received data by applying the one-way function to a value in the chain extracted from the authentication information for the received data and verifying whether a value associated in the chain with transmission order of data received in the past is generated or not.

An information processing method according to an exemplary aspect of the present invention includes: in a first information processing apparatus, generating a tag relating to transmission data by using a common key, generating a chain that is a sequence of values generated in order by repeatedly applying a one-way function to a value and in which generation order of each value is inversely associated with transmission order of data, generating authentication information for the transmission data by combining a value associated in the chain with transmission order of the transmission data with a tag relating to the transmission data, and transmitting the transmission data and the authentication information for the transmission data to a second information processing apparatus; and in the second information processing apparatus, receiving data and authentication information for the data from the first information processing apparatus, generating a tag relating to the received data by using the common key, extracting a value in the chain from the authentication information for the received data by using the tag relating to the received data, and authenticating the received data by applying the one-way function to a value in the chain extracted from the authentication information for the received data and verifying whether a value associated in the chain with transmission order of data received in the past is generated or not.

A first computer readable storage medium according to an exemplary aspect of the present invention records thereon a program causing a computer to perform a method including: generating a tag relating to transmission data by using a common key; generating a chain that is a sequence of values generated in order by repeatedly applying a one-way function to a value and in which generation order of each value is inversely associated with transmission order of data; generating authentication information for the transmission data by combining a value associated in the chain with transmission order of the transmission data with a tag relating to the transmission data; and transmitting the transmission data and authentication information for the transmission data to another information processing apparatus that applies the one-way function to a value in the chain extracted by using a tag relating to received data and authentication information for the received data, the tag relating to the received data being generated by using the common key, and verifies whether a value associated in the chain with transmission order of data received in the past is generated or not.

A second computer readable storage medium according to an exemplary aspect of the present invention records thereon a program causing a computer to perform a method including: receiving data and authentication information for the data from another information processing apparatus that generates authentication information for transmission data by combining a tag relating to the transmission data with a value associated in a chain with transmission order of the transmission data, the tag relating to the transmission data being generated by using a common key, the chain being a sequence of values generated in order by repeatedly applying a one-way function to a value and in which generation order of each value is inversely associated with transmission order of data; generating a tag relating to the received data by using the common key; extracting a value in the chain from the authentication information for the received data by using the tag relating to the received data; and authenticating the received data by applying the one-way function to a value in the chain extracted from the authentication information for the received data and verifying whether a value associated in the chain with transmission order of data received in the past is generated or not.

Advantageous Effects of Invention

An advantageous effect of the present invention is to be capable of executing highly secure broadcast authentication while reducing a delay until authentication, a communication amount, and a computation amount.

DESCRIPTION OF EMBODIMENTS

Figure 1:
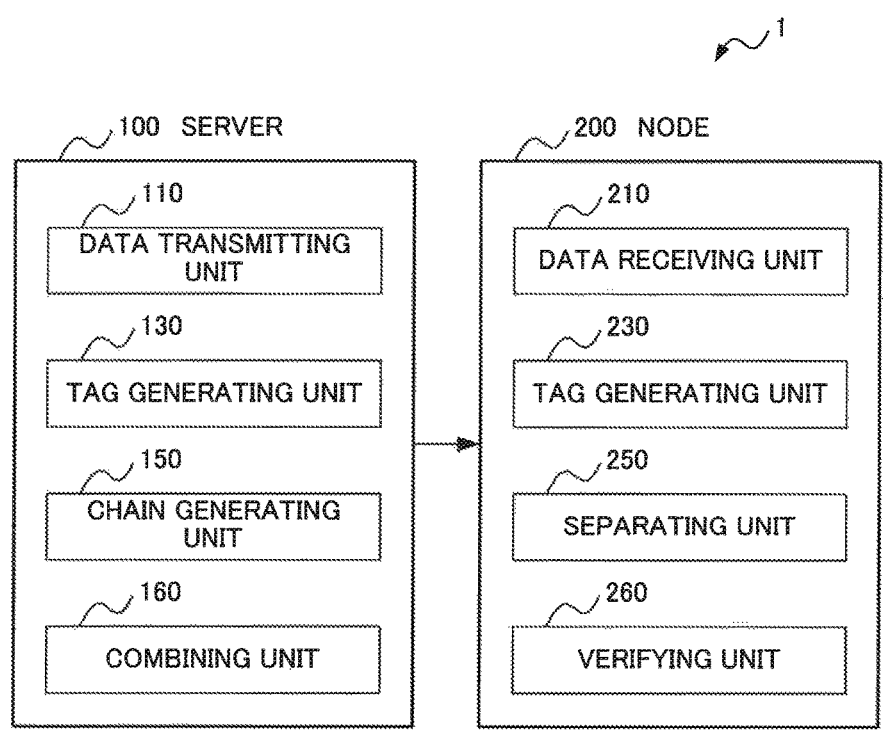
FIG. 1 is a block diagram illustrating a characteristic configuration according to a first example embodiment of the present invention.

Example embodiments of the present invention will be described in detail with reference to the drawings. In each of the drawings and in each of the example embodiments described herein, the same reference signs are assigned to the similar components, and description therefor will be omitted as appropriate. In addition, a direction of an arrow in the drawing indicates an example, but is not intended to limit the example embodiments of the present invention.

First Example Embodiment

A first example embodiment of the present invention will be described.

First, a configuration according to the first example embodiment of the present invention will be described.

Figure 2:
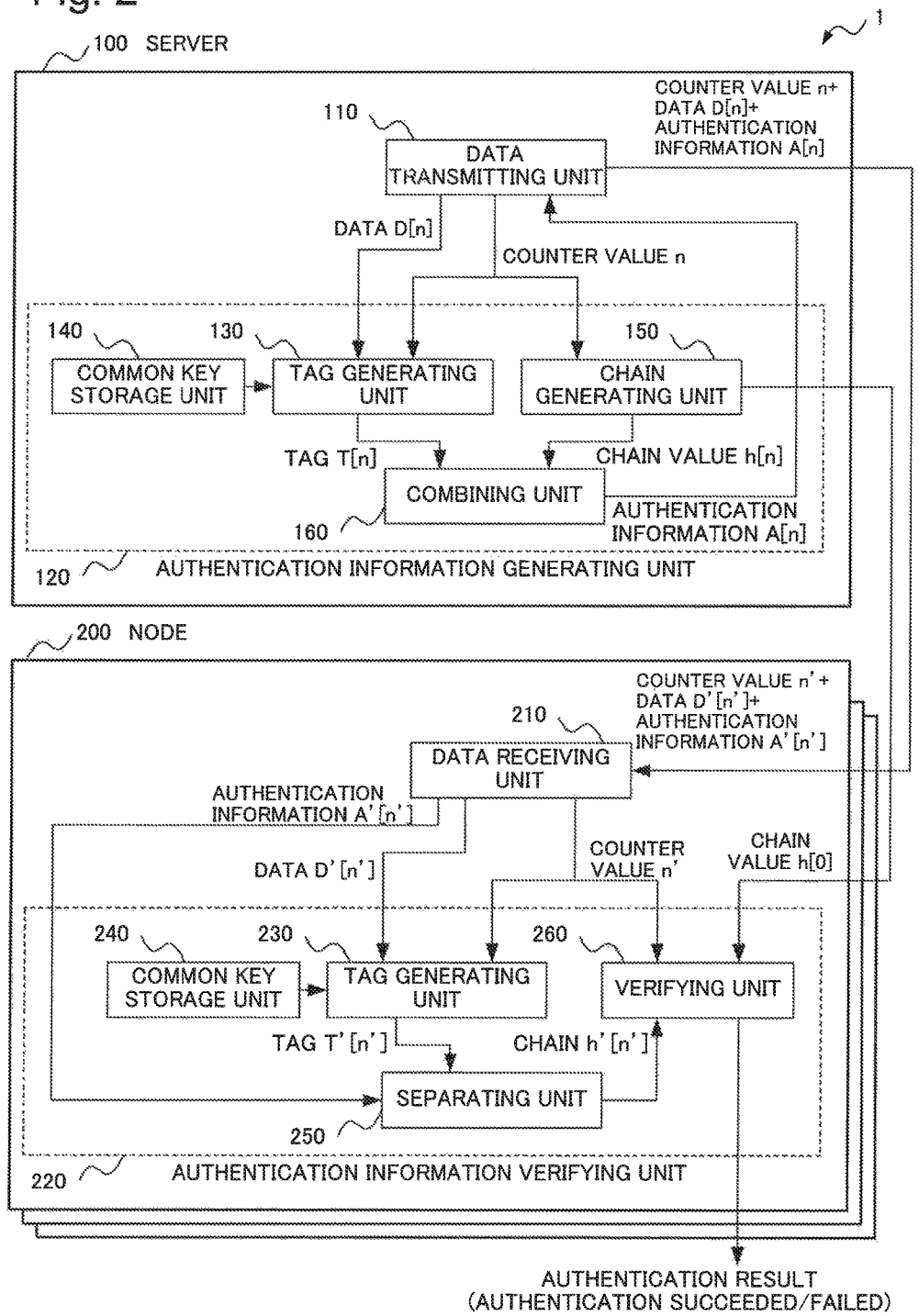
FIG. 2 is a block diagram illustrating a configuration of a broadcast authentication system 1 according to the first example embodiment of the present invention.

FIG. 2 is a block diagram illustrating a configuration of a broadcast authentication system 1 according to the first example embodiment of the present invention.

Referring to FIG. 2, the broadcast authentication system 1 includes a server 100 and one or more nodes 200. The server 100 and the nodes 200 are communicably connected via a network or the like. The server 100 broadcasts identical data (or a message) to all the communicably connected nodes 200. Each of the nodes 200 receives data transmitted from the server 100. The broadcast authentication system 1 is one example embodiment of an information processing system according to the present invention. The server 100 and the node 200 are respectively one example embodiment of a first information processing apparatus and a second information processing apparatus according to the present invention.

The server 100 includes a data transmitting unit 110 (or simply, a transmitting unit) and an authentication information generating unit 120.

The data transmitting unit 110 transmits a counter value indicating transmission order of data to be transmitted (transmission data), the transmission data, and authentication information for the transmission data to the nodes 200. The authentication information generating unit 120 generates authentication information.

The authentication information generating unit 120 includes a tag generating unit 130 (or a first tag generating unit), a common key storage unit 140, a chain generating unit 150, and a combining unit 160.

Figure 10:
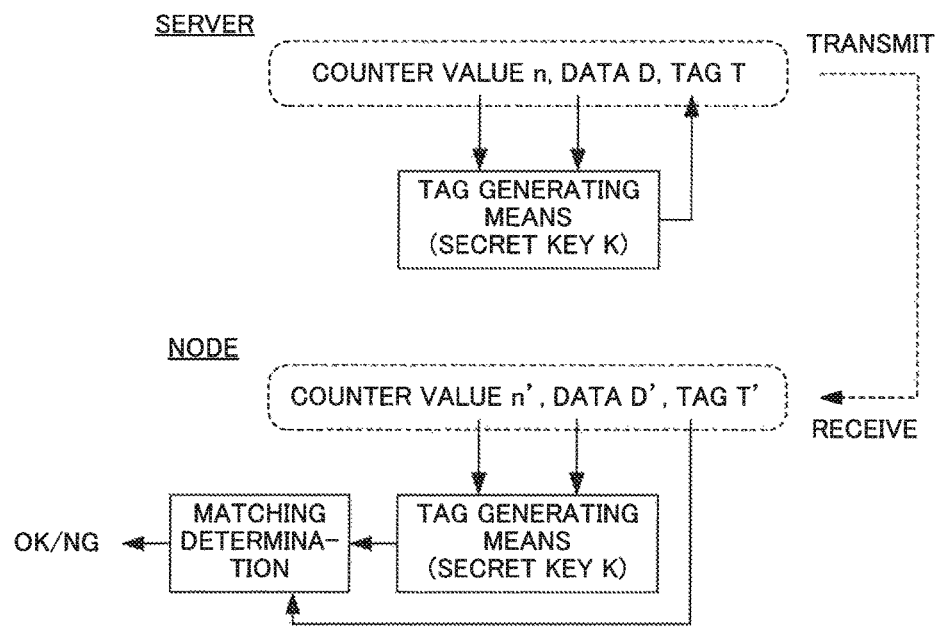
FIG. 10 is a diagram illustrating how general message authentication works.

The tag generating unit 130 generates a tag for message authentication relating to transmission data, similarly to the tag generating unit of FIG. 10. The tag generating unit 130, to which a counter value relating to transmission data and the transmission data are input, generates a tag by using a secret key (common key) shared with the nodes 200.

The common key storage unit 140 stores a secret key shared with the nodes 200.

Figure 3:
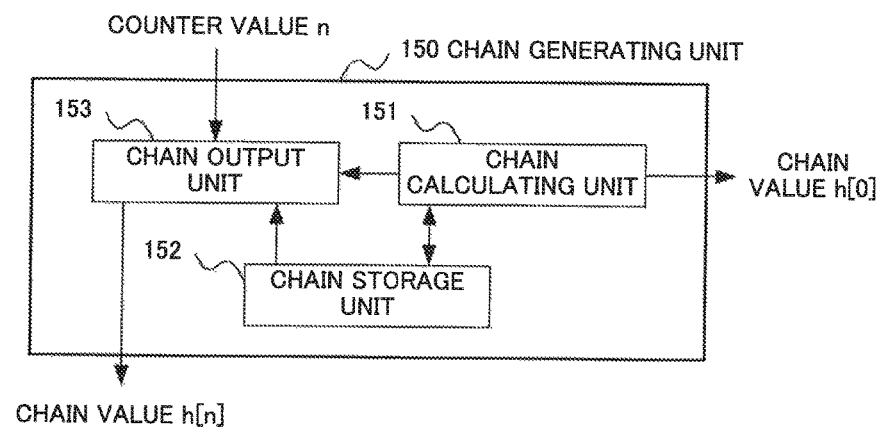
FIG. 3 is a block diagram illustrating a configuration of a chain generating unit 150 according to the first example embodiment of the present invention.

The chain generating unit 150 generates a one-way chain (or simply, a chain). FIG. 3 is a block diagram illustrating a configuration of the chain generating unit 150 according to the first example embodiment of the present invention.

The chain generating unit 150 includes a chain calculating unit 151, a chain storage unit 152, and a chain output unit 153.

The chain calculating unit 151 calculates a one-way chain by using a one-way function in a pre-process. The chain storage unit 152 stores the one-way chain calculated by the chain calculating unit 151. The chain output unit 153 outputs, from the one-way chain, a chain value associated with transmission order of transmission data in an authentication information generating process.

The combining unit 160 generates authentication information by combining a tag relating to transmission data with a chain value associated with transmission order of the transmission data.

The node 200 includes a data receiving unit 210 (or simply, a receiving unit) and an authentication information verifying unit 220.

The data receiving unit 210 receives a counter value indicating transmission order of data, the data, and authentication information for the data. The authentication information verifying unit 220 authenticates the received data by using authentication information.

The authentication information verifying unit 220 includes a tag generating unit 230 (or a second tag generating unit), a common key storage unit 240, a separating unit 250, and a verifying unit 260.

The tag generating unit 230 generates a tag for message authentication relating to received data, similarly to the tag generating unit 130. The tag generating unit 230, to which received counter value and received data are input, generates a tag by using a secret key (common key) shared with the server 100.

The common key storage unit 240 stores a secret key shared with the server 100.

The separating unit 250 extracts (separates) a chain value from received authentication information by using a tag relating to received data.

Figure 4:
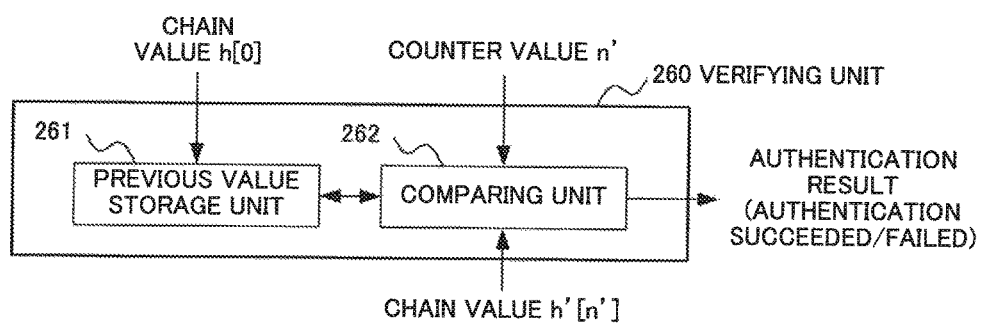
FIG. 4 is a block diagram illustrating a configuration of a verifying unit 260 according to the first example embodiment of the present invention.

The verifying unit 260 authenticates received data by using a chain value extracted from authentication information. FIG. 4 is a block diagram illustrating a configuration of the verifying unit 260 according to the first example embodiment of the present invention.

The verifying unit 260 includes a previous value storage unit 261 and a comparing unit 262.

The previous value storage unit 261 stores a counter value and a chain value relating to previously received data (data received in the past).

The comparing unit 262 verifies whether a counter value relating to new received data and a chain value extracted from authentication information are valid or not by using a one-way function, and a counter value and a chain value relating to previously received data.

Note that the server 100 and the node 200 each may be a computer that includes a CPU (Central Processing Unit) and a storage medium storing a program and operates under control of the program.

Figure 5:
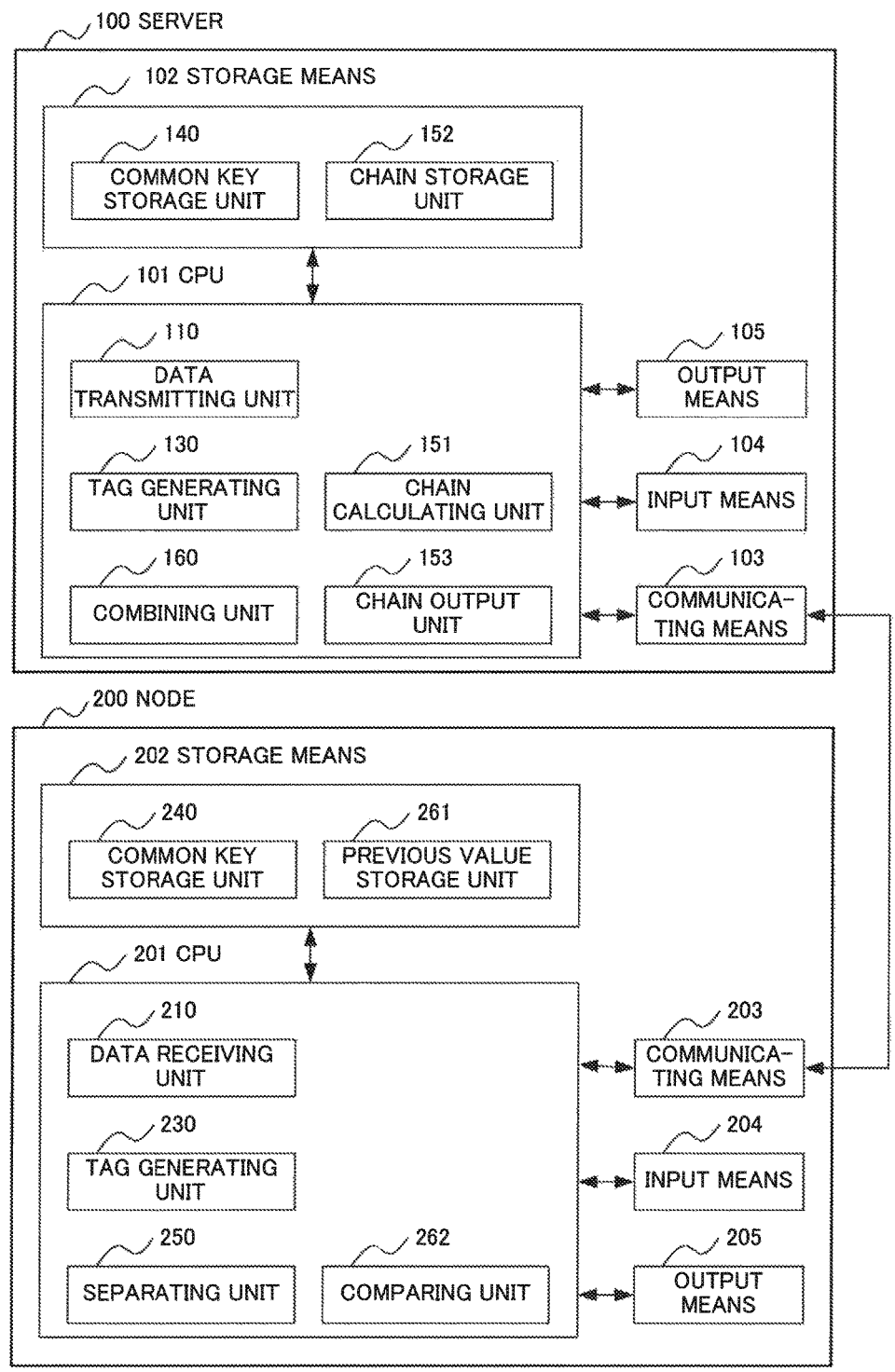
FIG. 5 is a block diagram illustrating a configuration of a server 100 and a node 200 implemented by a computer according to the first example embodiment of the present invention.

FIG. 5 is a block diagram illustrating a configuration of the server 100 and the node 200 implemented by a computer according to the first example embodiment of the present invention.

The server 100 includes a CPU 101, storage means (storage medium) 102 such as a hard disk or a memory, communicating means 103 that communicates with another device or the like, input means 104 such as a keyboard, and output means 105 such as a display. The CPU 101 executes a computer program for implementing functions of the data transmitting unit 110, the tag generating unit 130, the chain calculating unit 151, the chain output unit 153, and the combining unit 160. The storage means 102 stores data of the common key storage unit 140 and the chain storage unit 152. The communicating means 103 transmits (broadcasts) data or the like to the nodes 200. The input means 104 accepts input such as instruction for data transmission from a user or the like. The output means 105 outputs a result of execution of data transmission or the like to a user or the like.

Note that each of the components of the server 100 may be an independent logic circuitry.

Similarly, the node 200 includes a CPU 201, storage means 202, communicating means 203, input means 204, and output means 205. The CPU 201 executes a computer program for implementing functions of the data receiving unit 210, the tag generating unit 230, the separating unit 250, and the comparing unit 262. The storage means 202 stores data of the common key storage unit 240 and the previous value storage unit 261. The communicating means 203 receives data or the like from the server 100. The input means 204 accepts input such as instruction for executing data reception from a user or the like. The output means 205 outputs a result of execution of data reception or the like including a result of verification of received data to a user or the like.

Note that each of the components of the node 200 may be an independent logic circuitry.

Next, the operation of the first example embodiment according to the present invention will be described.

Figure 6:
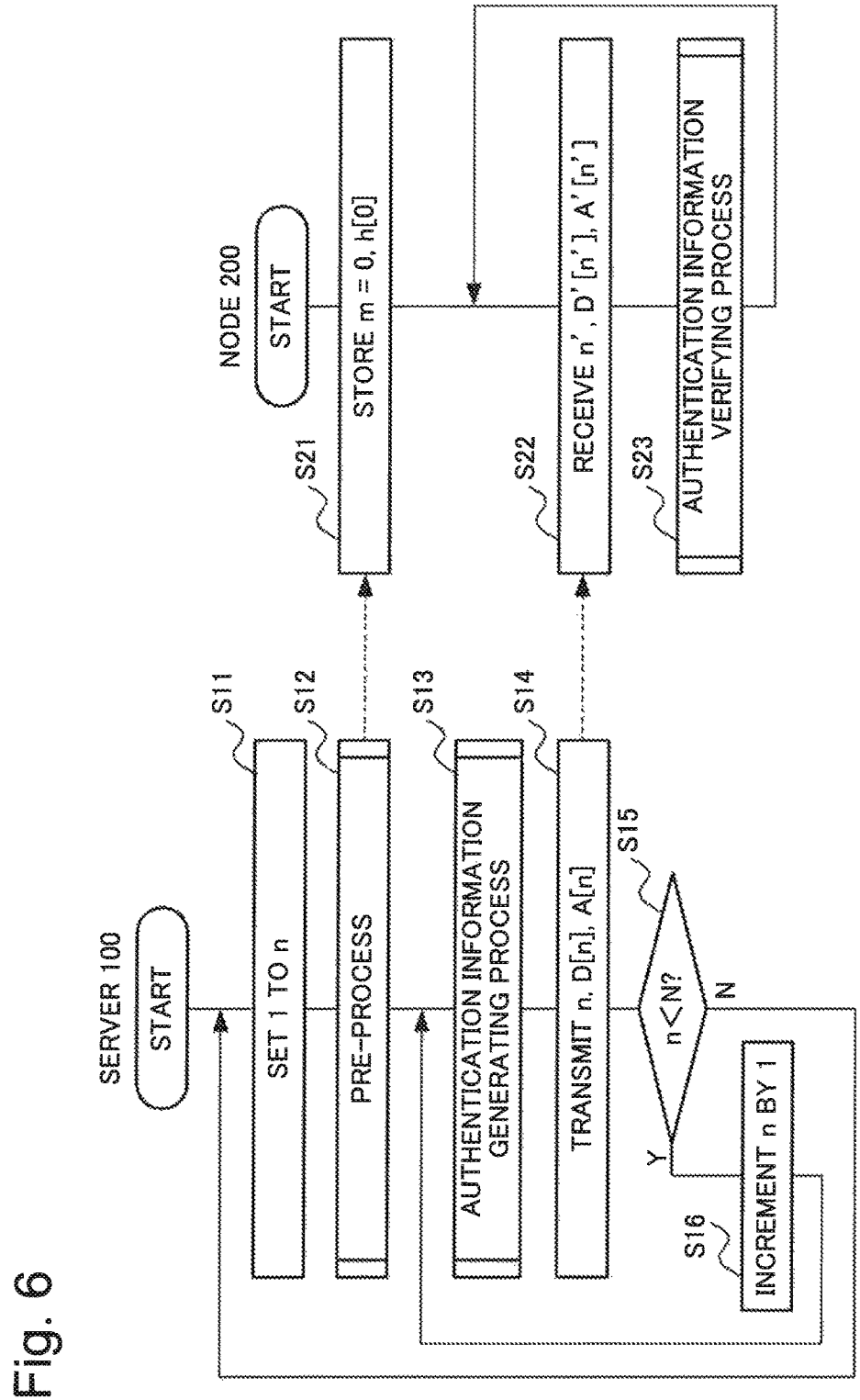
FIG. 6 is a flowchart illustrating operation of the broadcast authentication system 1 according to the first example embodiment of the present invention.

FIG. 6 is a flowchart illustrating the operation of the broadcast authentication system 1 according to the first example embodiment of the present invention.

First, the operation of the server 100 will be described.

The data transmitting unit 110 of the server 100 sets 1 to a counter value n (n is an integer equal to or more than 1) (Step S11).

The data transmitting unit 110 instructs the authentication information generating unit 120 to execute a pre-process. The authentication information generating unit 120 executes the pre-process (Step S12).

Figure 7:
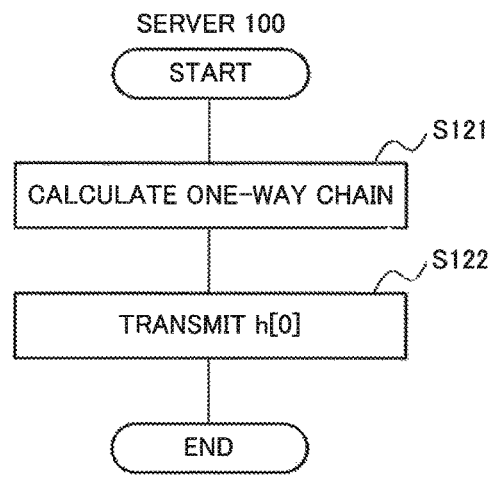
FIG. 7 is a flowchart illustrating a detail of a pre-process (Step S12) in the server 100 according to the first example embodiment of the present invention.

FIG. 7 is a flowchart illustrating a detail of the pre-process (Step S12) in the server 100 according to the first example embodiment of the present invention.

The chain calculating unit 151 of the chain generating unit 150 calculates a one-way chain by using a one-way function (Step S121). The chain calculating unit 151 stores the calculated one-way chain in the chain storage unit 152. Herein, the one-way function f(x) is a function having a nature that it is very difficult to find an inverse image x from f(x), such as a hash function. The one-way chain is a sequence of values (chain values) obtained by repeatedly applying the one-way function to a certain value. The chain calculating unit 151 calculates a chain value in the one-way chain in accordance with Math. 2.

$$h[i-1]=f(h[i]), i=N,N-1,\ldots,2,1 \qquad [\text{Math. 2}]$$

Herein, h[i] is a chain value, and N is a parameter (chain length) that determines an updating interval of the one-way chain (an interval for performing the pre-process). As an initial value h[N], for example, a random number determined for each pre-process is used. The obtained one-way chain is expressed as in Math. 3.

$$h[N] \rightarrow h[N-1] \rightarrow h[N-2] \rightarrow \ldots \rightarrow h[2] \rightarrow h[1] \rightarrow h[0] \qquad [\text{Math. 3}]$$

Note that the chain storage unit 152 does not need to store all of the chain values in Math. 3, but may store partial (thinned-out) chain values at a predetermined interval. In this case, the chain calculating unit 151 generates chain values not stored, with use of Math. 2, as needed.

The chain calculating unit 151 transmits a chain value h[0] calculated at N-th order to all the nodes 200 (Step S122). For detection of falsification in transmitting the chain value h[0], one-to-one secure communication between the server 100 and each node 200 or normal digital signature is used. When the above-described parameter N is sufficiently large, frequency of the pre-process can be reduced and overhead involved therein can be also sufficiently reduced.

Next, the data transmitting unit 110 inputs the counter value n and n-th transmission data D[n] to the authentication information generating unit 120, and instructs execution of an authentication information generating process. The authentication information generating unit 120 executes the authentication information generating process (Step S13).

Figure 8:
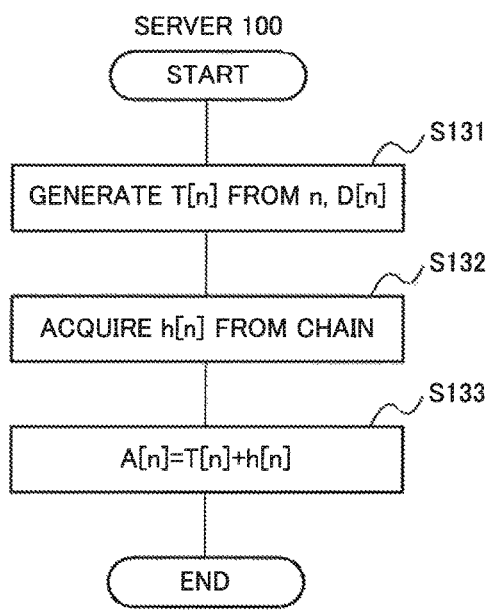
FIG. 8 is a flowchart illustrating a detail of an authentication information generating process (Step S13) in the server 100 according to the first example embodiment of the present invention.

FIG. 8 is a flowchart illustrating a detail of the authentication information generating process (Step S13) in the server 100 according to the first example embodiment of the present invention.

The tag generating unit 130 of the authentication information generating unit 120 generates a tag T[n] for message authentication from the counter value n and the transmission data D[n] (Step S131). Herein, the tag generating unit 130 generates the tag T[n] by using a secret key stored in the common key storage unit 140.

The chain output unit 153 of the chain generating unit 150 acquires, from the one-way chain stored in the chain storage unit 152, a chain value h[n] associated with transmission order (counter value n) of the transmission data D[n], and outputs the chain value h[n] (Step S132). Herein, transmission data is associated with a chain value in such a way that transmission order of pieces of transmission data is inverse to generation order of chain values in the one-way chain. In other words, the chain output unit 153 outputs chain values h[1], h[2], . . . , h[N] respectively for pieces of transmission data D[1], D[2], . . . , D[N] in order.

The combining unit 160 combines the tag T[n] with the chain value h[n] and generates authentication information A[n] (Step S133). The combining unit 160 outputs the generated authentication information A[n] to the data transmitting unit 110. Herein, the combining unit 160 generates the authentication information A[n] with use of, for example, exclusive OR of the tag T[n] and the chain value h[n]. The combining process performed by the combining unit 160 is expressed as in Math. 4.

$$A[n]=T[n]+h[n] \qquad [\text{Math. 4}]$$

Herein, "+" indicates a combining process such as exclusive OR.

Next, the data transmitting unit 110 transmits (broadcasts) the counter value n, the transmission data D[n], and the authentication information A[n] to all the node 200 (Step S14).

When the counter value n is smaller than the chain length N (Step S15/Y), the data transmitting unit 110 increments the counter value by 1 (Step S16), and repeats the processing from Step S13.

On the other hand, when the counter value n is equal to the chain length N (Step S15/N), the processing from Step S11 is repeated. Accordingly, the pre-process is performed per N-time data transmissions.

Note that in the pre-process, updating of the secret key for message authentication may be executed at the same time.

Next, the operation of the node 200 will be described.

When the node 200 receives the chain value h[0] generated through the pre-process from the server 100, the verifying unit 260 stores a counter value m=0 and the received chain value h[0] in the previous value storage unit 261 (Step S21).

Next, the data receiving unit 210 receives a counter value n', data D'[n'], and authentication information A'[n'] from the server 100 (Step S22).

The data receiving unit 210 inputs the counter value n', the received data D'[n'], and the authentication information A'[n'] to the authentication information verifying unit 220, and instructs execution of an authentication information verifying process. The authentication information verifying unit 220 executes the authentication information verifying process (Step S23).

Figure 9:
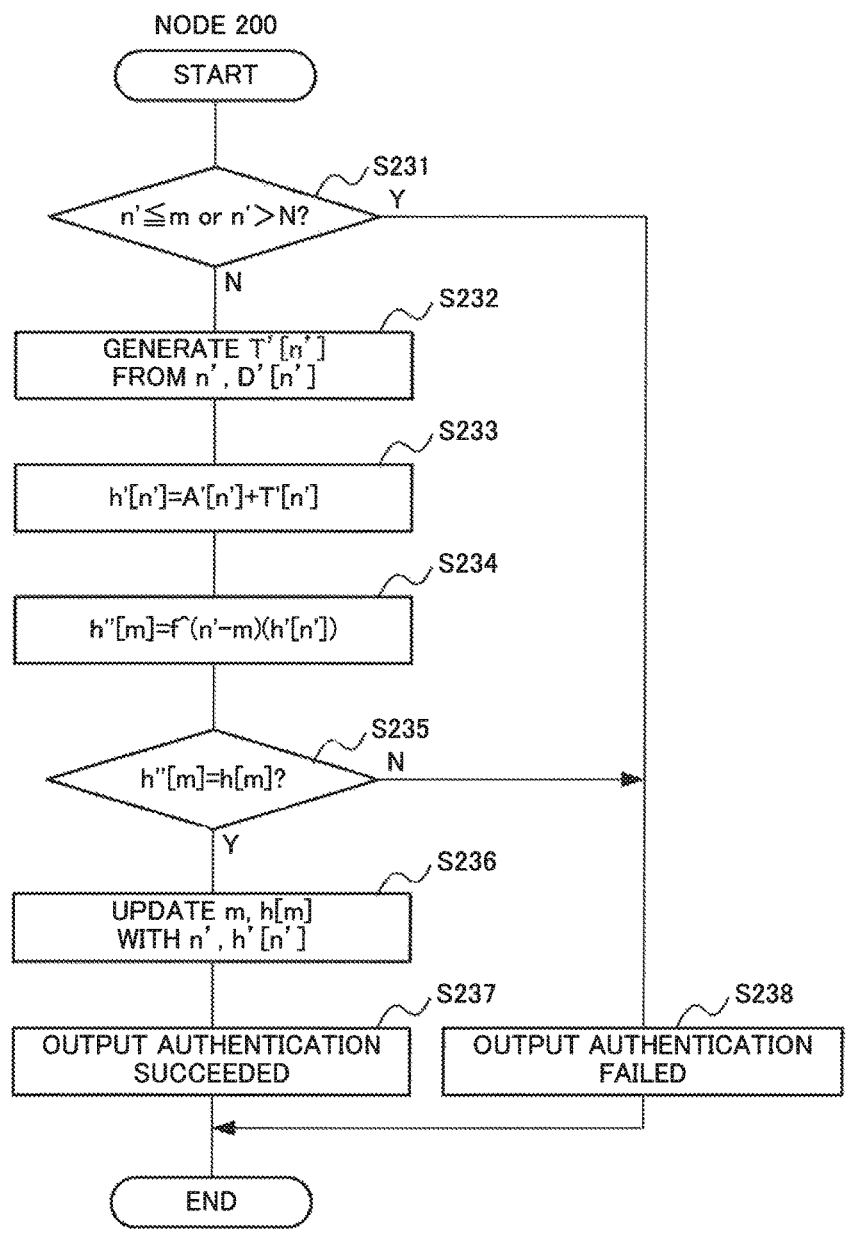
FIG. 9 is a flowchart illustrating a detail of an authentication information verifying process (Step S23) in the node 200 according to the first example embodiment of the present invention.

FIG. 9 is a flowchart illustrating a detail of the authentication information verifying process (Step S23) in the node 200 according to the first example embodiment of the present invention.

The comparing unit 262 of the verifying unit 260 determines whether the counter value n' is equal to or less than the counter value m stored in the previous value storage unit 261 or is greater than the chain length N (Step S231). When the counter value n' is equal to or less than m or is greater than the chain length N (Step S231/Y), the comparing unit 262 outputs "authentication failed" (Step S238).

When the counter value n' is greater than the counter value m and is equal to or less than the chain length N (Step S231/N), the tag generating unit 230 generates a tag T'[n'] for message authentication from the counter value n' and the received data D'[n'] (Step S232). Herein, the tag generating unit 230 generates the tag T'[n'] by using a secret key stored in the common key storage unit 240.

The separating unit 250 extracts (separates) a chain value h'[n'] from the authentication information A'[n'] by using the tag T'[n'] (Step S233). Herein, when the combining unit 160 generates authentication information with use of, for example, exclusive OR, the separating unit 250 also extracts the chain value h'[n'] with use of exclusive OR. The separating process performed by the separating unit 250 is expressed as in Math. 5.

$$h'[n']=A'[n']+T'[n']$$ [Math. 5]

The comparing unit 262 of the verifying unit 260 applies the one-way function to the chain value h'[n'] and calculates a chain value h''[m] associated with the counter value m (Step S234). The comparing unit 262 calculates the chain value h''[m] in accordance with Math. 6.

$$h''[m]=f^{\char`\^}(n'-m)(h'[n'])$$ [Math. 6]

Herein, f^(n'−m)(h'[n']) indicates that the one-way function f(x) is applied (n'−m) times to a chain value h'[n'].

The comparing unit 262 determines whether the calculated chain value h''[m] is equal to a chain value h[m] stored in the previous value storage unit 261 (Step S235). When the chain value h''[m] is equal to the chain value h[m] (Step S235/Y), the comparing unit 262 updates the counter value m and the chain value h[m] stored in the previous value storage unit 261 with the counter value n' and the chain value h'[n'] (Step S236). The comparing unit 262 then outputs, as a result of verification, "authentication succeeded" indicating that the counter value n' and the received data D'[n'] are valid data transmitted from the server 100 (Step S237).

On the other hand, when the chain value h''[m] is different from the chain value h[m] (Step S235/N), the comparing unit 262 outputs "authentication failed" as a result of verification (Step S238).

Note that, in a case that (n'−m) is large, the number of times of executing the one-way function in Math. 6 increases, even when the counter value n' is equal to or less than the chain length N at Step S231 described above. In order to avoid this, when (n'−m) is greater than a predetermined value at Step S231, "authentication failed" may be output.

Hereinafter, the processing from Step S22 is repeatedly executed.

The operation according to the first example embodiment of the present invention is thus completed.

Note that the first example embodiment of the present invention has described the operation by using broadcast communication as an example. However, without limitation thereto, the first example embodiment of the present invention is also applicable to multicast communication, which is simultaneous communication from the server 100 to a group of partial nodes 200 of the communicably connected nodes 200.

In this case, the chain generating unit 150 of the server 100 generates a one-way chain for each group for multicast (multicast group), and transmits a chain value h[0] of the one-way chain to the nodes 200 belonging to the multicast group. A counter indicating the number of times of transmission from the server 100 is also set for each multicast group. The combining unit 160 combines a chain value associated with a multicast group with a tag relating to transmission data, and generates authentication information for the transmission data.

Alternatively, for the tag generation in the tag generating units 130 and 230, the CMAC disclosed in NPL 1, the HMAC disclosed in NPL 2, and the like may be applied.

Alternatively, for the one-way function in the chain generating unit 150 and the verifying unit 260, the cryptographic hash function such as a SHA (Secure Hash Algorithm)-1 and a SHA-256 used in NPL 2 may be applied. Since a chain value in a one-way chain is preferably identical to a tag length for message authentication, a value obtained by truncating an output from these hash functions by the tag length is used as the chain value, as needed. A typical length of a tag for message authentication ranges from 64 to 128 bits.

Alternatively, for the one-way chain generated with the one-way function, a random identifier (ID) may be assigned to enhance inter-chain independence. In this case, the chain generating unit 150 calculates a chain value in the one-way chain by using, for example, a one-way function as in Math. 7.

$$h[i-1]=f(h[i])=\text{trunc}(H(R\|h[i]))$$ [Math. 7]

Herein, H( ) is a hash function, and R is a random ID. In addition, trunc( ) indicates that an output is truncated by a tag length for message authentication as described above, and || represents a linkage of bit strings. R is a random number determined for each pre-process in the server 100 similarly to h[N], and is set together with h[0] in the node 200. By this, tolerance against an attack in which an attacker makes an estimate by preliminarily generating a one-way chain is improved.

Alternatively, tolerance against the attack is further improved by calculating a hash value for a value that includes i as in Math. 8, in the hash function of Math. 7, by the chain generating unit 150.

$$h[i-1] = f(h[i]) = \text{trunc}(H(i\|R\|h[i]))$$ [Math. 8]

Alternatively, a next one-way chain may be generated together with updating of a secret key for message authentication through a pre-process, by setting a value larger than the number of times of data transmission within an updating interval of the secret key to the chain length N. For example, when the number of times of data transmission is at most once an hour and a key updating interval is once a month, the number of times of data transmission within the secret key updating interval is at most approximately 800. In this case, approximately 1000 to 2000 is set to the chain length N, in consideration of a margin.

Note that setting a large chain length N affects the pre-process and a storage amount for storing a one-way chain in the server 100. Thus, as described above, the chain storage unit 152 stores thinned-out chain values of the one-way chain. By this, a trade-off can be achieved between the storage amount and a computation amount or a delay required for calculating a chain value at a time of data transmission.

Typically, the chain storage unit 152 stores a chain value h[i] at an interval of $N^{(1/2)}$, and the chain calculating unit 151 calculates h[n] with at most $N^{(1/2)}$-time processing of a one-way function f. For example, when N=10,000, the chain storage unit 152 stores chain values h[0], h[100], h[200], . . . , h[9900], and h[10000] in a pre-process. Herein, for example, in a case of calculating h[101], the chain calculating unit 151 applies the one-way function f to h[200] ninety-nine times. Further, the chain storage unit 152 stores some of h[i] calculated in the process, and thus, a computation amount for calculating h[n] for 101≤n<200 can be reduced.

Next, a characteristic configuration of the first example embodiment of the present invention will be described. FIG. 1 is a block diagram illustrating a characteristic configuration of the first example embodiment of the present invention.

Referring to FIG. 1, a broadcast authentication system 1 (information processing system) includes a server 100 (first information processing apparatus) and a node 200 (second information processing apparatus).

The server 100 includes a tag generating unit 130 (first tag generating means), a chain generating unit 150 (chain generating means), a combining unit 160 (combining means), and a data transmitting unit 110 (transmitting means). The tag generating unit 130 generates a tag relating to transmission data by using a common key. The chain generating unit 150 generates a chain that is a sequence of values generated in order by repeatedly applying a one-way function to a value and in which generation order of each value is inversely associated with transmission order of data. The combining unit 160 generates authentication information for the transmission data by combining a value associated in the chain with transmission order of the transmission data with a tag relating to the transmission data. The data transmitting unit 110 transmits the transmission data and the authentication information for the transmission data to a second information processing apparatus.

The node 200 includes a data receiving unit 210 (receiving means), a tag generating unit 230 (second tag generating means), a separating unit 250 (separating means), and a verifying unit 260 (verifying means). The data receiving unit 210 receives data and authentication information for the data from the first information processing apparatus. The tag generating unit 230 generates a tag relating to the received data by using the common key. The separating unit 250 extracts a value in the chain from the authentication information for the received data by using the tag relating to the received data. The verifying unit 260 authenticates the received data by applying the one-way function to a value in the chain extracted from the authentication information for the received data and verifying whether a value associated in the chain with transmission order of previously received data is generated or not.

Next, an advantageous effect of the first example embodiment of the present invention will be described.

The advantageous effect of the first example embodiment of the present invention is to be capable of executing highly secure broadcast authentication while reducing a delay until authentication, a communication amount, and a computation amount. The reason is as follows.

The server 100 generates authentication information for transmission data by combining a tag relating to the transmission data and a chain value associated in a chain with transmission order. The tag relating to transmission data is generated by using a common key. The chain is generated by using a one-way function. The node 200 verifies whether a chain value associated with transmission order of received data in the past is generated or not by applying the one-way function to a chain value extracted by using a tag relating to received data and authentication information for the received data. The tag relating to received data is generated by using the common key.

In this manner, in the first example embodiment of the present invention, the server 100 and the nodes 200 preliminarily share a secret key (common key), and transmit and receive data and authentication information simultaneously. Consequently, no delay occurs from data reception to authentication of received data, unlike TESLA.

In addition, in the first example embodiment of the present invention, a size of authentication information transmitted and received simultaneously with data can be the same as that of a tag generated by using a common key. Consequently, there is no difference in a communication amount in comparison with general one-to-one-communication message authentication.

In addition, in the first example embodiment of the present invention, even if an attacker have acquired a secret key, the attacker is unable to falsify data and authentication information transmitted from the server 100 unless estimating a chain value from the data and the authentication information. In addition, nodes 200 caused to receive falsified data by the attacker is limited to nodes 200 which has not yet received valid data from the server 100. In one-hop broadcasting such as a wireless LAN (Local Area Network), it is expected that most of the nodes 200 have completed reception of valid data from the server 100 before the attacker acquires data from the server 100 and then transmits falsified data. Accordingly, in the first example embodiment of the present invention, a chance of an attack by an attacker is significantly reduced, and thus, security is improved.

Second Example Embodiment

Next, a second example embodiment of the present invention will be described.

In the second example embodiment of the present invention, a plurality of secret key are further used.

Herein, v (v is an integer equal to or more than 1) secret key sets $L[i](i=1, 2, \ldots, v)$ each of which includes w (w is an integer equal to or more than 1) secret keys are used. It is assumed that different secret key sets $L[i]$ have no common element (common secret key). In this case, when all the secret key sets are defined as $L=L[1] \cup L[2] \cup \ldots \cup L[v]$, the number of secret keys of all the secret key sets L is vw.

In the second example embodiment of the present invention, the common key storage unit 140 of the server 100 stores all the secret key sets L. The common key storage unit 240 of each of the nodes 200 stores v secret keys that are assigned one by one from respective secret key sets $L[i]$.

The tag generating unit 130 of the server 100 generates v tag sets $T[n][i](i=1, 2, \ldots, v)$ each of which includes w tags (respectively associated with w secret keys) by using all the secret keys included in the respective secret key sets $L[i]$ for transmission data $D[n]$. The tag generating unit 130 then truncates each of the tags by a length of q/v relative to an original tag length q. In this case, a total length of the tags of all the tag sets is qw.

The combining unit 160 divides a one-way chain value $h[n]$ (with a length of q) output from the chain generating unit 150 into v $h[n][i](i=1, 2, \ldots, v)$ with a length of q/v. The combining unit 160 generates v authentication information sets $A[n][i](i=1, 2, \ldots, v)$ each of which includes w pieces of authentication information (respectively associated with w secret keys) by combining w tags included in the tag sets $T[n][i]$ with $h[n][i]$ for each i. In this case, a total length of the pieces of authentication information is also qw.

The server 100 transmits a counter value n, data $D[n]$, and v authentication information sets $A[n][i]$.

The node 200 receives a counter value n', data $D'[n']$, and v authentication information sets $A'[n'][i]$.

The tag generating unit 230 of each of the nodes 200 generates v tags for the received data $D'[n']$ by using v secret keys assigned to the node 200.

The separating unit 250 extracts v $h'[n'][i]$ from pieces of authentication information associated with the secret keys assigned to the node 200 in the respective v authentication information sets $A'[n'][i]$ by using the generated tags. The separating unit 250 then generates a chain value $h'[n']$ from v $h'[n'][i]$.

The verifying unit 260 authenticates the received data $D'[n']$ by verifying the generated chain value $h'[n']$ by using a one-way function.

In the second example embodiment of the present invention, secret keys can be assigned to up to $w^v$ nodes 200 in such a way that none of secret keys match between different nodes 200. In this case, even when a certain node 200 is attacked and a secret key is leaked from the node 200, it is difficult to generate authentication information to be accepted by another node 200.

When secret keys are leaked from a plurality of nodes 200, an attacker can obtain all secret keys held by the partial nodes 200.

However, node 200 caused to receive falsified data by the attacker is limited to node 200 which has not yet received valid data from the server 100 among the partial nodes 200, and thus, security is further improved.

Next, an advantageous effect of the second example embodiment of the present invention will be described.

The advantageous effect of the second example embodiment of the present invention is to be capable of further enhancing security in comparison with the first example embodiment of the present invention. The reason is that the server 100 uses a plurality of secret keys to generate a plurality of pieces of authentication information, and the node 200 uses a secret key assigned to the node 200 among a plurality of secret keys to extracts a chain value from authentication information associated with the assigned secret key.

While the present invention has been particularly shown and described with reference to example embodiments thereof, the present invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention is applicable to broadcast authentication in a wireless LAN, a sensor network, Internet communication, and the like.

REFERENCE SIGNS LIST

1 Broadcast authentication system
100 Server
101 CPU
102 Storage means
103 Communicating means
104 Input means
105 Output means
110 Data transmitting unit
120 Authentication information generating unit
130 Tag generating unit
140 Common key storage unit
150 Chain generating unit
151 Chain calculating unit
152 Chain storage unit
153 Chain output unit
160 Combining unit
200 Node
201 CPU
202 Storage means
203 Communicating means
204 Input means
205 Output means
210 Data receiving unit
220 Authentication information verifying unit
230 Tag generating unit
240 Common key storage unit
250 Separating unit
260 Verifying unit
261 Previous value storage unit
262 Comparing unit

The invention claimed is:

1. An information processing system comprising:
a first information processing apparatus including
a memory storing instructions, and
one or more processors configured to execute the instructions to:
generate a tag relating to transmission data by using a common key,
generate a chain that is a sequence of values generated in order by repeatedly applying a one-way function to a value and in which generation order of each value is inversely associated with transmission order of data,
generate authentication information for the transmission data by combining a value associated in the chain with transmission order of the transmission data with a tag relating to the transmission data, and
transmit the transmission data and the authentication information for the transmission data to a second information processing apparatus; and
the second information processing apparatus including
a memory storing instructions, and
one or more processors configured to execute the instructions to:
receive data and authentication information for the data from the first information processing apparatus,
generate a tag relating to the received data by using the common key,
extract a value in the chain from the authentication information for the received data by using the tag relating to the received data, and
authenticate the received data by applying the one-way function to a value in the chain extracted from the authentication information for the received data and verifying whether a value associated in the chain with transmission order of data received in the past is generated or not.

2. The information processing system according to claim 1, further comprising
a plurality of the second information processing apparatuses, wherein,
in the first information processing apparatus,
the transmission data and the authentication information for the transmission data are transmitted to the plurality of the second information processing apparatuses.

3. The information processing system according to claim 2, wherein,
in the first information processing apparatus,
a chain is generated for each of groups each including one or more second information processing apparatuses among the plurality of second information processing apparatuses, and
authentication information for the transmission data is generated by combining a value in the chain for a group to receive the transmission data with a tag relating to the transmission data.

4. The information processing system according to claim 2, wherein,
in the first information processing apparatus,
a plurality of tags relating to the transmission data is generated by using a plurality of common keys, respectively,
a plurality of pieces of authentication information for the transmission data is generated by combining a value associated in the chain with transmission order of the transmission data with the plurality of tags, respectively, and
the transmission data and the plurality of pieces of authentication information for the transmission data are transmitted,
the plurality of common keys are respectively assigned to the plurality of the second information processing apparatuses,
in each of the plurality of the second information processing apparatus,
data and a plurality of pieces of authentication information for the data are received,
a tag relating to the received data is generated by using a common key assigned to the second information processing apparatus, and
a value in the chain is extracted from a piece of authentication information corresponding to the common key assigned to the second information processing apparatus among the plurality of pieces of authentication information for the received data, by using the tag relating to the received data.

5. An information processing apparatus comprising:
a memory storing instructions; and
one or more processors configured to execute the instructions to:
generate a tag relating to transmission data by using a common key;
generate a chain that is a sequence of values generated in order by repeatedly applying a one-way function to a value and in which generation order of each value is inversely associated with transmission order of data;
generate authentication information for the transmission data by combining a value associated in the chain with transmission order of the transmission data with a tag relating to the transmission data; and
transmit the transmission data and authentication information for the transmission data to another information processing apparatus that applies the one-way function to a value in the chain extracted by using a tag relating to received data and authentication information for the received data, the tag relating to the received data being generated by using the common key, and verifies whether a value associated in the chain with transmission order of data received in the past is generated or not.

6. An information processing method comprising:
in a first information processing apparatus,
generating a tag relating to transmission data by using a common key,
generating a chain that is a sequence of values generated in order by repeatedly applying a one-way function to a value and in which generation order of each value is inversely associated with transmission order of data,
generating authentication information for the transmission data by combining a value associated in the chain with transmission order of the transmission data with a tag relating to the transmission data, and
transmitting the transmission data and the authentication information for the transmission data to a second information processing apparatus; and
in the second information processing apparatus,
receiving data and authentication information for the data from the first information processing apparatus,
generating a tag relating to the received data by using the common key,
extracting a value in the chain from the authentication information for the received data by using the tag relating to the received data, and authenticating the received data by applying the one-way function to a value in the chain extracted from the authentication information for the received data and verifying whether a value associated in the chain with transmission order of data received in the past is generated or not.

* * * * *